(12) United States Patent
Foner

(10) Patent No.: US 11,421,808 B2
(45) Date of Patent: Aug. 23, 2022

(54) CONNECT UNDER PRESSURE COUPLING ASSEMBLY

(71) Applicant: Parker-Hannifin Corporation, Cleveland, OH (US)

(72) Inventor: Brian K. Foner, Saint Louis Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/757,779

(22) PCT Filed: Jan. 29, 2019

(86) PCT No.: PCT/US2019/015605
§ 371 (c)(1),
(2) Date: Apr. 21, 2020

(87) PCT Pub. No.: WO2019/156850
PCT Pub. Date: Aug. 15, 2019

(65) Prior Publication Data
US 2021/0190248 A1     Jun. 24, 2021

Related U.S. Application Data

(60) Provisional application No. 62/626,743, filed on Feb. 6, 2018.

(51) Int. Cl.
*F16L 37/34*     (2006.01)
(52) U.S. Cl.
CPC .......... *F16L 37/34* (2013.01); *F16L 2201/20* (2013.01)
(58) Field of Classification Search
CPC ........ F16L 37/28; F16L 37/34; F16L 2201/20
(Continued)

(56) References Cited

U.S. PATENT DOCUMENTS

| 3,646,964 A | 3/1972 | Stratman |
| 4,221,235 A | 9/1980 | Maldavs |

(Continued)

FOREIGN PATENT DOCUMENTS

| WO | 82/01929 | 6/1982 |
| WO | 2014/161906 | 10/2014 |

OTHER PUBLICATIONS

International Search Report and Written Opinion for corresponding International Patent Application No. PCT/US2019/015605 dated Mar. 22, 2019.

*Primary Examiner* — Kevin L Lee
(74) *Attorney, Agent, or Firm* — Renner, Otto, Boisselle & Sklar, LLP

(57) ABSTRACT

A coupling assembly includes a nipple component and a coupler component that are connectable to each other to form a fluid flow pathway through the coupling assembly. The nipple component includes a nipple body that defines a chamber that receives a first valve and a second valve that are moveable within the chamber, and the first valve and the second valve are spring biased against each other by a spring loaded plunger of the first valve, and a second valve spring that biases the second valve in the closed position. During a connection operation and/or a disconnection operation, a balance of forces including the spring bias, in combination with system pressure, maintains the second valve in a closed position, thereby isolating the fluid flow from an area of the chamber in which components of the first valve reside, including isolating an interface seal from fluid flow.

20 Claims, 10 Drawing Sheets

(58) Field of Classification Search
USPC .................................. 137/614.03, 614.05
See application file for complete search history.

(56) References Cited

U.S. PATENT DOCUMENTS

| | | |
|---|---|---|
| 5,873,386 A | 2/1999 | Arosio |
| 5,884,897 A * | 3/1999 | Arosio .................. F16L 37/34 |
| | | 251/149.6 |
| 5,996,624 A | 12/1999 | Ekman |
| 6,237,632 B1 * | 5/2001 | Smith, III ............ E21B 33/038 |
| | | 137/614.19 |
| 6,382,251 B1 | 5/2002 | Hopson |
| 6,675,833 B2 * | 1/2004 | Maldavs ................ F16L 37/23 |
| | | 137/614.03 |

* cited by examiner

CONNECT UNDER PRESSURE COUPLING ASSEMBLY

RELATED APPLICATIONS

This application is a 35 U.S.C § 371 national stage application of International Application No. PCT/US2019/015605 filed on Jan. 29, 2019, which claims the benefit of U.S. Provisional Application No. 62/626,743 filed Feb. 6, 2018, the contents of which are incorporated herein by reference.

FIELD OF INVENTION

The present invention relates generally to couplings for use in fluid systems that operate under high pressure, such as for example hydraulic couplings, and more particularly to managing the pressure of such systems during an act of connection or disconnection of the coupling.

BACKGROUND OF THE INVENTION

A significant challenge in connection and disconnection of hydraulic couplings is managing the internal hydraulic pressure during the acts of connection and disconnection. If the internal pressure in the coupling is not managed properly, the system pressure can result in an inability to connect or disconnect the coupling, which can cause significant damage to internal valve components and/or result in an unsafe system event. This problem is particularly challenging in non-spill style hydraulic couplings in which the coupling must be disconnected without spillage of the hydraulic fluid. A non-spill style of coupling utilizes an interface seal that seals between both halves of the coupling while connected, but also serves as a valve seal when the male half is disconnected from the female half.

Conventional configurations have used an additional valve in one of the coupling halves, but uses of such additional valve have been limited to either a poppet style coupling, or if a non-spill type of coupling, this configuration has difficulty in completely isolating pressure at the interface seal during critical moments of the connect/disconnect sequence. For example, some prior art designs have used a multi-valve configuration by which a back valve located in the nipple component of the coupling is directly forced open prior to full connection by a front valve in the female coupler component. Accordingly, in the operation of such a configuration, the front valve directly and mechanically forces the back valve open prior to full connection. As pressure may be present in the system during connection, additional features are provided to isolate the interface seal from exposure to high pressure conditions. Such systems may include a reducing element to minimize the applied force due to the pressure in the system that otherwise could expose the interface seal to the system pressure.

In certain pressure conditions, however, such direct opening of the back valve does not achieve the isolation of high pressure from the interface seal prior to full connection, and also subjects the back valve to being directly opened during a state of very high differential pressure. Such an arrangement requires very special design considerations of the back valve to ensure durability to opening under such high pressure differentials so as to prevent damage to the interface seal. Accordingly, management of pressure during connection and disconnection operations have required complex solutions.

SUMMARY OF THE INVENTION

The present invention provides an enhanced coupling assembly having improved pressure management during connection and disconnection operations. Accordingly, the coupling assembly may be employed for enhanced performance in fluid systems that may operate under high pressures, such as hydraulic fluid systems. In comparison to conventional configurations referenced above, in the coupling assembly of this disclosure the back valve remains closed in times of high pressure differential thus easing full connection, and only allowing the back valve to open when the pressure differential is reduced across the back valve to a manageable level. In this manner, the interface seal remains isolated from high pressure conditions during connection and disconnection, thus addressing the durability challenges that are not adequately accounted for in conventional configurations.

The fluid coupling assembly of the present disclosure includes two individual coupling halves, including a female coupler component and a male nipple component. The coupler component has a port end of a valve body which is connectable to a first fluid line, and an opposite end which is connectable to the nipple component. The nipple component also has a port end of a back body of the nipple component, which is connectable to a second fluid line. The nipple also has an end opposite from the fluid connection which is connectable to the coupler component, thereby providing a fluid connection between the first and second fluid lines when the two main components of the coupler assembly are in the fully connected state.

The nipple component generally is constructed with a two-valve arrangement for controlling fluid communication in response to connection state and system pressure conditions. The two-valve arrangement includes at least a front valve and a back valve housed within a chamber defined by the nipple component. The back valve isolates the fluid flow from a front area of the chamber in which the front valve components reside. More specifically, it is desirable to isolate the fluid flow from the interface seal and further isolate the interface seal from high system pressures during certain times of transition in a connection and disconnection sequence of the coupling assembly. The front valve may be rigidly fixed to a front valve guide, and an end of the front valve also may be deformed to retain a valve plunger within the nipple body. In addition, a retaining ring may be provided that holds a back valve guide in the back body against the bias of a back valve spring.

The configuration of the fluid coupling assembly operates to isolate the interface seal from high system pressure during connection and disconnection sequences. The separation forces that must be overcome during connection of the coupler component and the nipple component are largely a function of the hydraulic pressure realized at the interface seal. By isolating the interface seal during various stages in the connection/disconnection sequences, the separation forces can be substantially reduced, thus easing connection by the user and further protecting the mechanical components of the fluid coupling assembly. This fluid coupling assembly utilizes a combination of the at least two valves, i.e., the front valve and the back valve, which are spring biased against each other. The same basic principles can be applied to any two-or-more valve arrangement placed in the nipple component, as well as with the concept of a back valve operational in response to both spring biases of the front valve and back valve and high system pressures from the fluid connection end.

An aspect of the invention is an enhanced coupling assembly that isolates front valve components including the interface seal during the connection and/or disconnection operations. In exemplary embodiments, the coupling assembly includes a nipple component and a coupler component that are connectable to each other to form a fluid flow pathway through the coupling assembly. The nipple component comprises a nipple body that defines a chamber that receives a first (front) valve and a second (back) valve that are moveable within the chamber, and the first valve and the second valve are spring biased against each other. During a connection operation to connect the nipple component and the coupler component and/or during a disconnection operation to disconnect the nipple component and the coupler component, a balance of forces including the spring bias (in combination with system pressure) maintains the second valve in a closed position, thereby isolating the fluid flow from an area of the chamber in which components of the first valve reside, including isolating the interface seal from fluid flow and high system pressure.

To attain the isolation of the front valve components including the interface seal from the fluid flow, the first valve of the nipple component includes a plunger that is spring loaded by a plunger spring, and the first valve is moveable between a first position and a second position during the connection and/or disconnection operations. The plunger spring provides a spring force during the connection and/or disconnection operations in a direction toward moving the second valve of the nipple component to an open position when the first valve is in the second position. The second valve includes a second valve spring providing a spring force that biases the second valve toward the closed position and against the spring force of the plunger spring. During the connection operation, a balance of forces including the spring forces of the plunger spring and the second valve spring (in combination with system pressure) maintains the second valve in the closed position, which isolates the interface seal. A similar balance of forces maintains the second valve in the closed position during the disconnection operation. When the nipple component and the coupler component are in a fully connected state, pressure at the second valve is reduceable to alter the balance of forces including the spring forces to move the second valve from the closed position to an open position, thereby permitting fluid flow through the coupling assembly.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
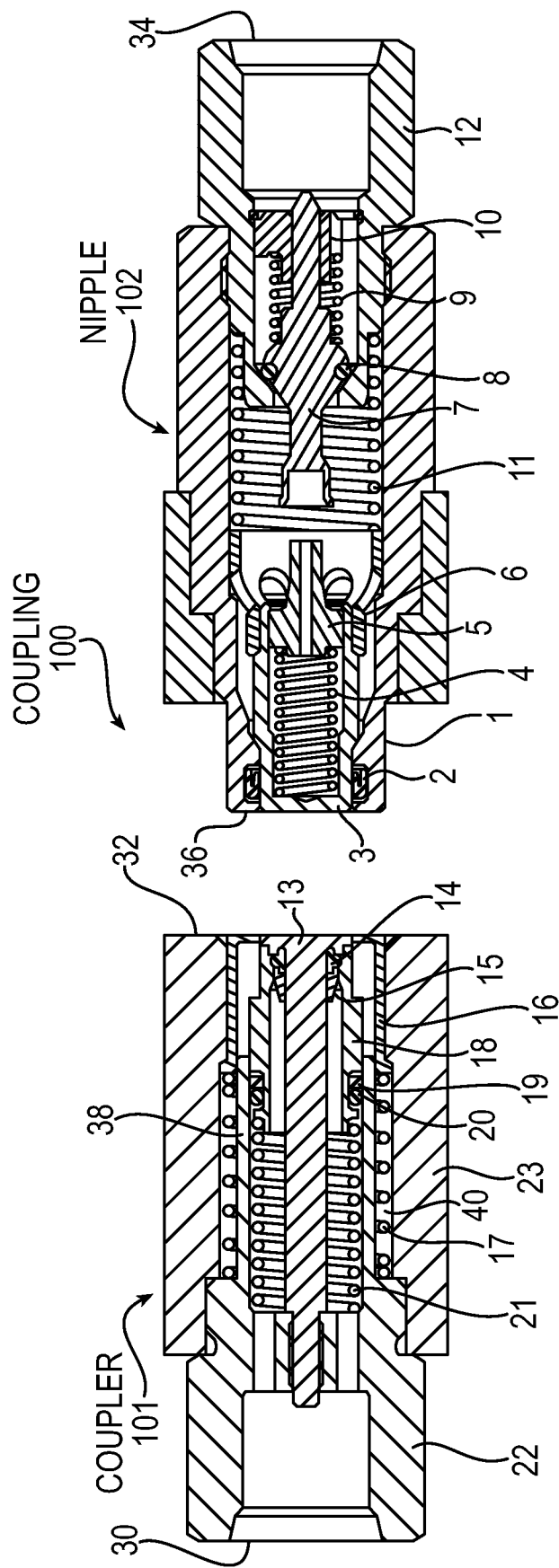
FIG. 1 is a drawing depicting a side cross-sectional view of an exemplary coupling assembly including a coupler component and a nipple component, in accordance with embodiments of the present invention.

Embodiments of the present invention will now be described with reference to the drawings, wherein like reference numerals are used to refer to like elements throughout. It will be understood that the figures are not necessarily to scale.

Generally, an aspect of the invention is an enhanced coupling assembly that isolates front valve components including the interface seal during the connection and/or disconnection operations. In exemplary embodiments, the coupling assembly includes a nipple component and a coupler component that are connectable to each other to form a fluid flow pathway through the coupling assembly. The nipple component comprises a nipple body that defines a chamber that receives a first (front) valve and a second (back) valve that are moveable within the chamber, and the first valve and the second valve are spring biased against each other. During a connection operation to connect the nipple component and the coupler component and/or during a disconnection operation to disconnect the nipple component and the coupler component, a balance of forces including the spring bias (in combination with system pressure) maintains the second valve in a closed position, thereby isolating the fluid flow from an area of the chamber in which components of the first valve reside, including isolating the interface seal from fluid flow and high system pressure.

FIG. 1 is a drawing depicting a side cross-sectional view of an exemplary coupling assembly 100, including a coupler component 101 and a nipple component 102, in accordance with embodiments of the present invention. The nipple component and the coupler component are connectable to each other to form a fluid flow pathway through the coupling assembly 100. The coupler component 101 may be a female component, and the nipple component 102 may be a male component. FIG. 1 depicts the two components in a disconnected state and separate from each other. The coupler component 101 has a port end 30 which is connectable to a first fluid line, and an opposite end 32 which is connectable to the nipple component 102. The nipple component 102 has a port end 34, which is connectable to a second fluid line, and an end 36 opposite from the fluid connection end which is connectable to the coupler component 101 so as to provide a connection between the first fluid line and the second fluid line when the coupler component and nipple component are fully connected.

The nipple component generally is constructed with a two-valve arrangement including a front valve 3 and a back valve 7 for controlling fluid communication in response to a connection state of the coupling assembly and system pressure conditions. The terms "front" and "back" are utilized for convenience of explanation in connection with reference to the figures having the illustrated orientation of the elements. As orientation may be varied, the front and back valves more broadly may be referred to or considered respectively as a first valve 3 and a second valve 7 in the two-valve arrangement.

Referring to FIG. 1, the nipple component 102 includes a nipple body 1 that defines a chamber that receives the front valve 3 and the back valve 7 that are moveable within the chamber. The front valve 3 of the nipple component is moveable between a first position and a second position, and includes a plunger 5 that is spring loaded by a plunger spring 4 that biases the plunger 5 toward the right direction in FIG. 1. The valve body 1 further defines a recess that houses an interface seal 2. A front valve guide 6 is provided within the chamber of the nipple body 1 to guide movement of the front valve during connection and disconnection operations between the first position and the second position, as further detailed below. The front valve 3 may be rigidly fixed to the front valve guide 6, and an end of the front valve also may be deformed to retain the valve plunger 5 within the nipple body 1. The front valve 3 is loaded by a valve spring 11 that biases the front valve 3 toward the first position.

The nipple body 1 further receives a back body 12 that defines the port end 34 of the nipple component 102. The nipple component 102 includes a back valve 7 as a second valve in the two-valve arrangement, which is movable within the back body 12 between a closed position and an open position. In the disconnected state of FIG. 1, the back valve 7 is in the closed position. An additional back valve spring 9 aids in controlling the opening and closing of the back valve 7 during connection and disconnection operations, as further detailed below, and the back valve spring 9 biases the back valve 7 toward the closed position. A back valve seal 8 seals the back valve 7 against an inner surface of the back body 12, and a back valve guide 10 guides movement of the back valve 7 during the connection and disconnection operations between the closed position and the open position. The back valve guide 10 may include a retaining ring that holds the back valve guide 10 in the back body 7 against the bias of the back valve spring 9.

With such configuration, the front valve 3 and the back valve 7 are spring biased against each other by the opposing spring forces of the plunger spring 4 and the back valve spring 9. As further detailed below, during a connection operation to connect the nipple component and the coupler component and/or during a disconnection operation to disconnect the nipple component and the coupler component, a balance of forces including the spring bias maintains the second valve in a closed position, thereby isolating the fluid flow from an area of the chamber in which components of the first valve reside, including isolating the interface seal 2. More specifically, during the connection and/or disconnection operations, a balance of forces including the spring forces of the plunger spring and the back valve spring, in combination with system pressure, maintains the back valve in the closed position. When the nipple component and the coupler component are in a fully connected state, pressure at the back valve is reduceable to alter the balance of forces including the spring forces to move the second valve from the closed position to an open position, thereby permitting fluid flow through the coupling assembly. These operations are described in more detail below in connection with the additional figures.

The coupler component 101 includes a valve body 22 that defines the port end 30. The valve body 22 is fixed to a housing 23, thereby defining a chamber that receives a coupler valve 13. The valve body 22 includes an extending nose 38 that extends into the chamber radially inward into the housing 23, and the coupler valve 13 is moveable along an inner surface of the nose 38 between a disconnected position and a connected position. An O-ring 20 that is backed up by a back-up ring 19 provides a seal of the coupler valve 13 against the nose 38 of the valve body 22. An additional coupler valve seal 14 that is retained within a seal retainer 15 provides a seal to prevent leakage of fluid flow when the coupling assembly 100 is in the disconnected state.

The coupler valve 13 further includes a valve sleeve 18 that interacts with the front valve 3 of the nipple component 102 during a connection operation, as further detailed below. The valve sleeve 18 is biased in the position of FIG. 1 by a sleeve spring 21. The coupler component 101 further includes a face sleeve 16 that is moveable between a first face sleeve position and a second face sleeve position during the connection/disconnection sequence, as also further detailed below. In particular, the face sleeve is moveable within a gap 40 that is defined between the nose 38 of the valve body 22 and an inner surface of the housing 23. FIG. 1 depicts the face sleeve 16 in the first face sleeve position, and the face sleeve 16 is biased toward the first face sleeve position by a face sleeve spring 17 that is positioned within the gap 40.

Generally, to attain the isolation of the front valve components including the interface seal from the fluid flow, the front valve 3 is moveable between a first position and a second position during the connection and/or disconnection operations. The plunger spring 4 that biases the plunger 5 of the front valve provides a spring force during the connection and/or disconnection operations in a direction toward moving the back valve 7 of the nipple component to an open position when the front valve is in the second position. The back valve spring 9 provides a spring force that biases the back valve toward the closed position and against the spring force of the plunger spring 4. During the connection operation, a balance of forces including the spring forces of the plunger spring and the back valve spring (in combination with system pressure) maintains the back valve in the closed position to isolate the interface seal from fluid flow and high system pressure. A similar balance of forces maintains the back valve in the closed position during the disconnection operation to maintain such isolation of the interface seal. When the nipple component and the coupler component are in a fully connected state, pressure at the back valve is reduceable to alter the balance of forces including the spring forces to move the back valve from the closed position to an open position, thereby permitting fluid flow through the coupling assembly.

Referring to the elements in the figures, the back valve 7 isolates the fluid flow from the front of the chamber in the area in which the components of the front valve 3 reside. More specifically, it is desirable to isolate the fluid flow from the interface seal 2 to isolate the interface seal from high system pressures during certain times of transition in a connection and disconnection sequence of operations of the coupling assembly. The separation forces that must be overcome during connection of the coupler and nipple components are largely a function of the hydraulic pressure realized at the interface seal 2. By isolating the interface seal 2 during various stages of the connection/disconnection sequences, the separation forces can be substantially reduced, thus easing connection by the user and further protecting the mechanical components of the coupling assembly 100, and protecting the interface seal in particular. To isolate the interface seal, the coupling assembly 100 utilizes the combination of the at least two valves, i.e., the front valve 3 and the back valve 7 of the nipple component, which are spring biased against each other via the plunger spring 4 and the back valve spring 9. The same basic principles can be applied to any two-or-more valve arrangement placed in the coupling assembly, as well as with the concept of a back valve operational in response to both spring biases of the front valve and back valve and high system pressures from the fluid connection end.

FIGS. 2-7 illustrate a progression of stages of the coupling assembly 100 to achieve connection of the coupler component 101 and nipple component 102. For clarity of illustration, reference numerals in FIGS. 2-7 are limited to the more pertinent elements involved at the respective stage of operation. In addition, FIG. 2 includes a key that designates different levels of shading as representing different pressure areas relative to each other. In particular, the dark shading corresponds to high pressure areas relative to low pressure areas that are designated by the light shading. Such designations of different pressure areas are utilized in the subsequent figures to illustrate various states of the pressure differential or equalization during the different stages of the connection and disconnection sequences.

Figure 2:
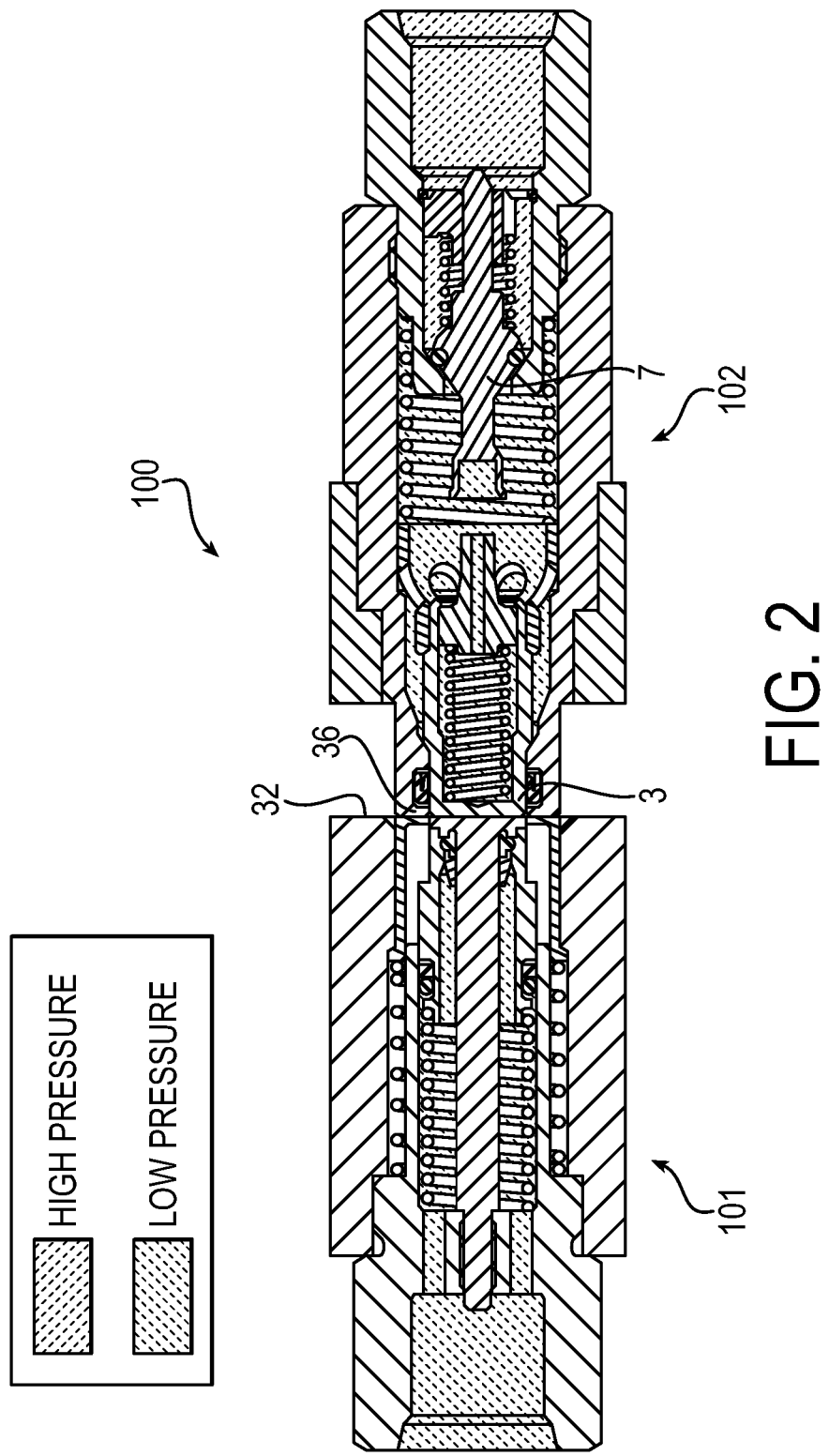
FIG. 2 is a drawing depicting a first operational step for connection of the coupling assembly of FIG. 1.

FIG. 2 is a drawing depicting a first operational step for connection of the coupling assembly 100. In this first operational step, the coupler component 101 and the nipple component 102 are first placed in a position in which end faces of each component come into initial contact with each other. In other words, the end 32 of the coupler component 101 is brought into contact with the end 36 of the nipple component 102. As this stage, there basically is no interaction between the coupler component 101 and the nipple component 102, as FIG. 1 merely illustrates first contact, and there thus is no fluid communication between the two components. Accordingly, as shown in FIG. 2, when the nipple component and the coupler component are in a disconnected state in which the nipple component and the coupler component are not in fluid communication, the interface seal 2 seals against the front valve 3. The internal passages of each component are shown as filled with fluid, such as for example a hydraulic fluid or comparable oil, in either a high pressure or a low pressure condition. In the example depicted in the figures for purposes of illustration, the nipple component 102 is shown as if the nipple component 102 is connected to the hydraulic system of a machine in which there is high pressure (dark shading), and the coupler component 101 is depicted as being connected on a low pressure side of the system (light shading). The back valve 7 of the nipple component is in a closed position, thereby isolating the other elements of the nipple and coupler components from the high pressure.

Figure 3:
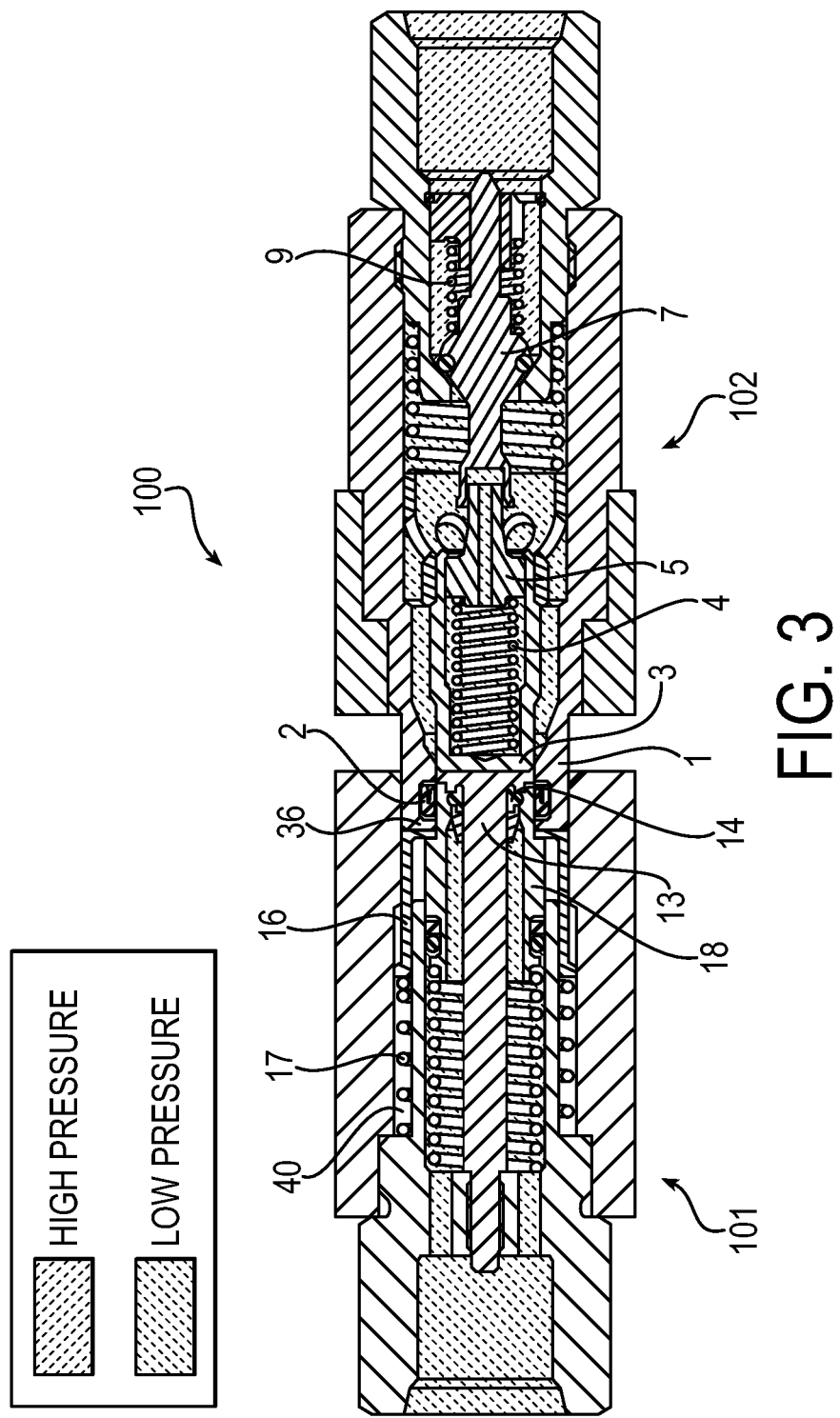
FIG. 3 is a drawing depicting a second operational step for connection of the coupling assembly.

FIG. 3 is a drawing depicting a second operational step for connection of the coupling assembly 100. In this second operational step, the two coupling components are moved into a partially connected state, but fluid communication between the coupler and nipple components is not yet established. Where the coupler and nipple components are coming together, the nipple body 1 at end 36 interacts against the face sleeve 16. Generally, as the coupler component 102 and nipple component 102 are connected, the coupler valve 13 of the coupler component interacts against the front valve 3 of the nipple to move the front valve 3 valve from the first position to the second position.

As the components are joined, the nipple body 1 interacts against the face sleeve 16 to move the face sleeve from the first face sleeve position into the second face sleeve position, whereby the face sleeve spring 17 is compressed as the face sleeve 16 moves inward (left in the figure) within the gap 40. The nipple body 1, including the interface seal 2, moves inward of the coupler component 101 relative to the front valve 3 of the nipple component. In this manner, the interface seal 2 has fully transitioned from sealing contact with the front valve 3, to sealing contact with the valve sleeve 18 of the coupler component 101. Accordingly, in subsequent stages when the nipple component and the coupler component are in a connected state or partially connected state in which the nipple component and the coupler component are in fluid communication, the interface seal 2 seals against the coupler valve 13, and particularly seals against the valve sleeve 18. At this stage, the valve sleeve 18 remains in sealing engagement with the coupler valve seal 14 so there is as yet no fluid communication between the coupler and nipple components.

In addition, as the components are joined together the coupler valve 13 interacts against the front valve 3, which forces the front valve 3, including the plunger 5, toward the back valve 7 within the nipple component, and the plunger spring 4 of the plunger 5 thus becomes energized. At this stage, there still is no interaction with the back valve 7 which remains closed, and thus the high system pressure remains isolated from the interface seal 2 by the back valve 7 during the transition from FIG. 2 to FIG. 3.

Figure 4:
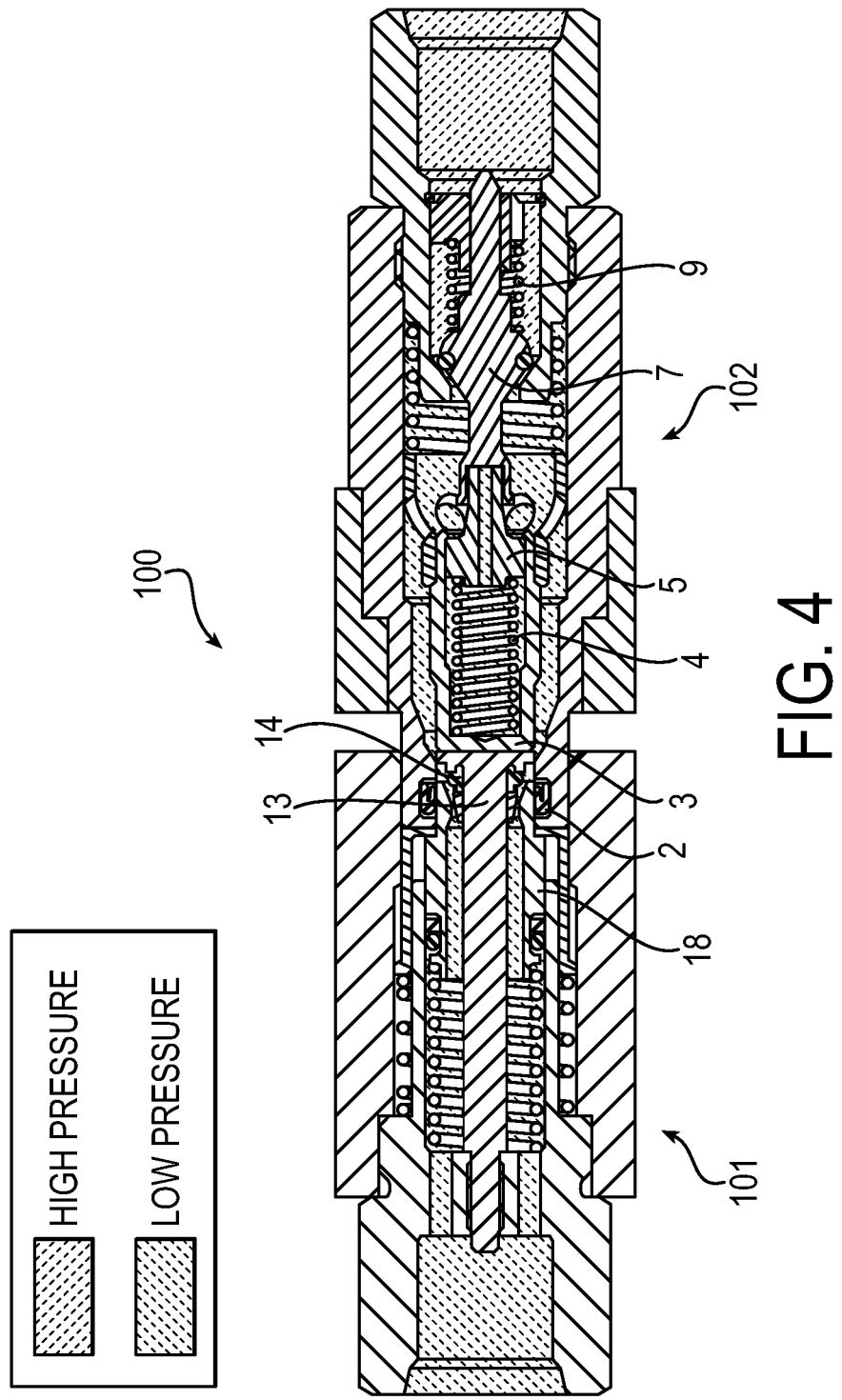
FIG. 4 is a drawing depicting a third operational step for connection of the coupling assembly.

FIG. 4 is a drawing depicting a third operational step for connection of the coupling assembly 100. In this third operational step, as the two components are further joined, by interaction of the coupler valve 13 of the coupler component against the front valve 3 of the nipple component, the valve sleeve 18 of the coupler component has been displaced off from sealing contact with the coupler valve seal 14. With the valve sleeve 18 displaced from the coupler valve seal 14 as indicated, fluid communication is established between the coupler component 101 and the nipple component 102 at the front of the chamber defined by the nipple component 102 in the area of the front valve 3. In this manner, the valve sleeve 18 is moveable between a first valve sleeve position corresponding to the disconnected state, and a second valve sleeve position corresponding to the connected or partially connected state. The coupler valve seal 14 seals against the valve sleeve 18 when the valve sleeve in the first valve sleeve position to prevent fluid communication between the nipple component and the coupler component (FIG. 3), and the coupler valve seal 14 does not seal against the valve sleeve when the valve sleeve in the second valve sleeve position to permit fluid communication between the nipple component and the coupler component (FIG. 4).

At this stage of the connection operation, within the nipple component the plunger 5 biased by the energized plunger spring 4 comes in initial contact with the back valve 7. At this stage of mere initial contact by the plunger 5, the back valve 7 remains closed and continues to isolate the high pressure from the other elements of the coupling assembly, including continuing to isolate the high pressure from the interface seal 2.

Figure 5:
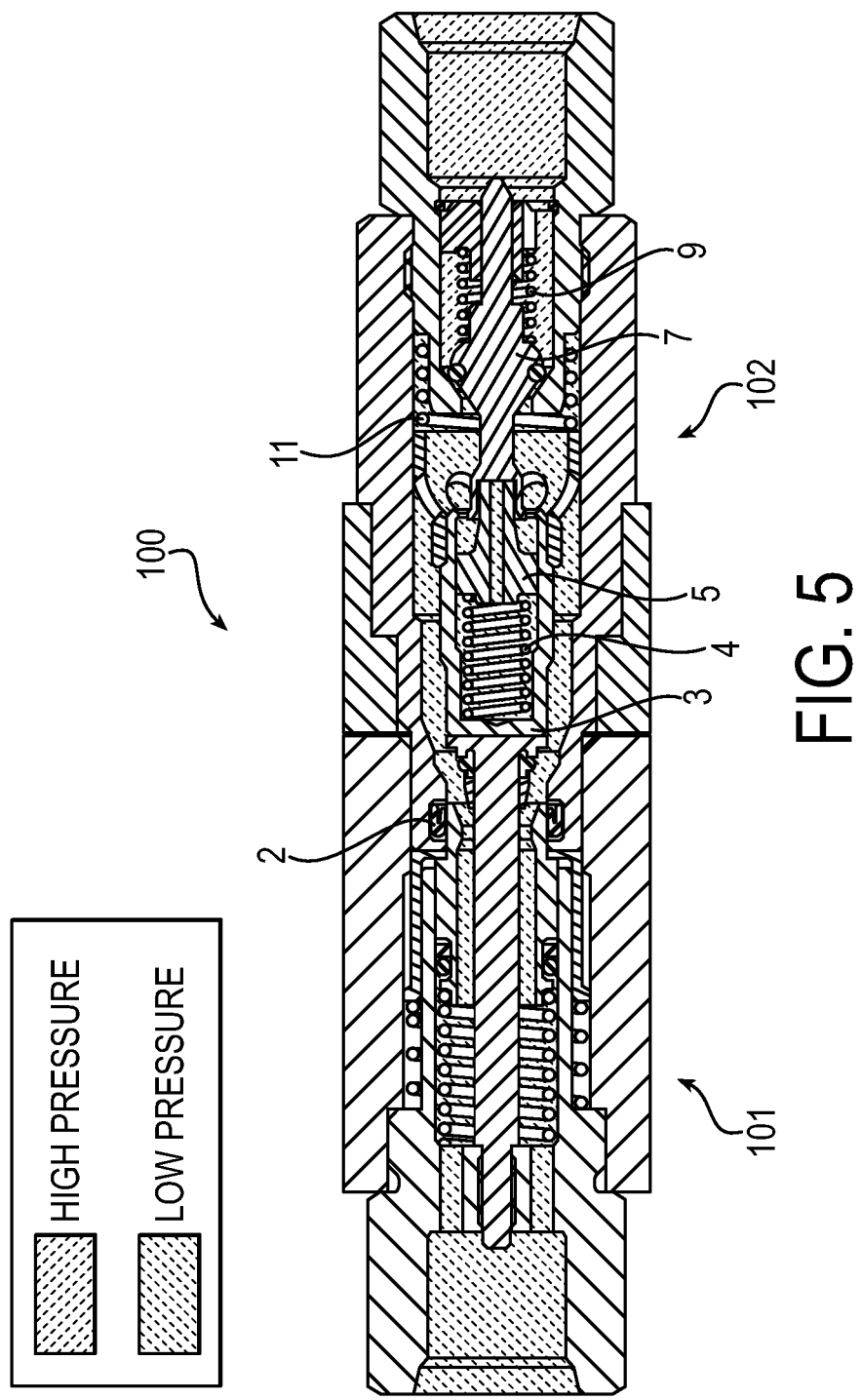
FIG. 5 is a drawing depicting a fourth operational step for connection of the coupling assembly.

FIG. 5 is a drawing depicting a fourth operational step for connection of the coupling assembly 100. In this fourth operational step, the coupler component 100 and the nipple component 102 are in a fully connected position. The plunger 5 compresses the valve spring 11, and the plunger 5 under the force of the energized plunger spring 4 applies a force tending to move the back valve 7 into the open position. At this stage, full fluid communication is not yet established; rather, the back valve 7 remains closed in response to the combination of forces being applied to the back valve 7. In particular, the combination of the spring force of the back valve spring 9 and the high pressure in the system is greater than the opening force being applied by the plunger spring 4. Accordingly, the back valve 7 remains in the closed position, thereby continuing to isolate the high pressure, even with the coupler and nipple components being fully connected.

Figure 6:
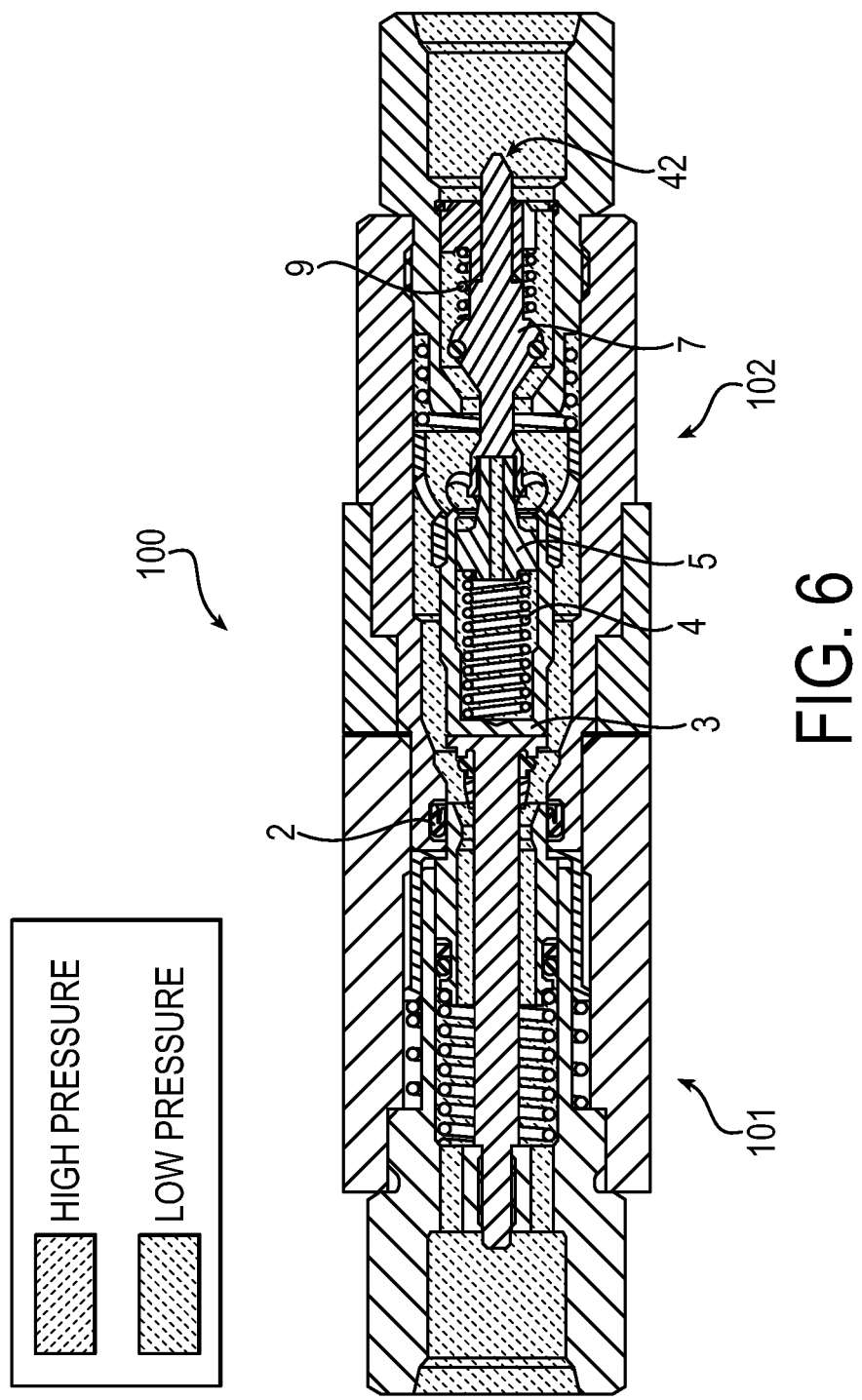
FIG. 6 is a drawing depicting a fifth operational step for connection of the coupling assembly, in which the components of the coupling assembly are fully connected.

FIG. 6 is a drawing depicting a fifth operational step for connection of the coupling assembly 100. FIG. 6 illustrates the coupler component 101 and the nipple component 102 in a fully connected position similar to FIG. 5, but now with full fluid communication established between both coupling assembly components. In transitioning from the stage of FIG. 5 to the stage of FIG. 6, the high pressure condition on the nipple side of the hydraulic system is reduced. For example, a system control valve may be operated to reduce the high pressure to remove the previous pressure differential through the coupling assembly. In FIG. 6, the elimination of the pressure differential is indicated by the common light shading (relatively low pressure) throughout the coupling assembly 100. With the pressure reduced to eliminate the pressure differential, the combination of remaining forces on the back valve 7 allows the plunger spring 4 to urge the back valve 7 against the force of the back valve spring 9 to an open position. Comparing FIG. 6 to FIG. 5, as designated at arrow 42, the back valve 7 has displaced to the right in the figures to the open position to establish a continuous fluid path through the coupling assembly.

Figure 7:
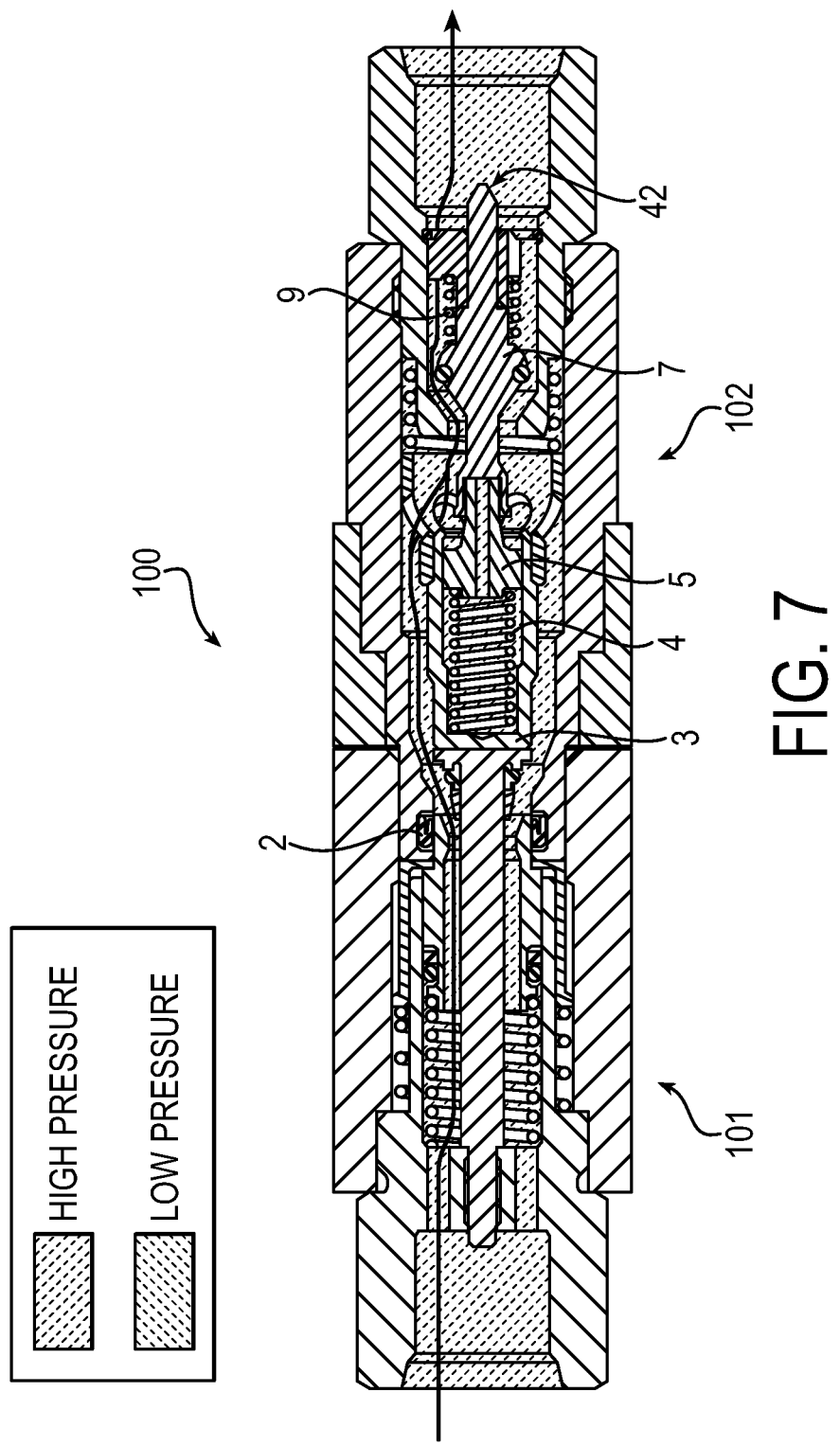
FIG. 7 is a drawing depicting the flow path upon opening of the coupling assembly while in the connected state with full fluid communication as shown in FIG. 6.

FIG. 7 is a drawing depicting the flow path upon opening of the coupling assembly by opening of the back valve 7, while in the connected state with full fluid communication as shown in FIG. 6. The internal passages are now dark shaded to show high pressure throughout the coupling assembly as associated with normal operating conditions. The arrow in FIG. 7 indicates an initial direction of flow upon reduction of the high pressure condition at the back valve, as the flow initially would go toward the back valve to equalize pressure through the coupling assembly once the high pressure condition is released. It will be appreciated, however, that during operation depending upon the desired operating conditions, with full fluid communication established the flow can proceed in either direction through the coupling assembly.

Figure 8:
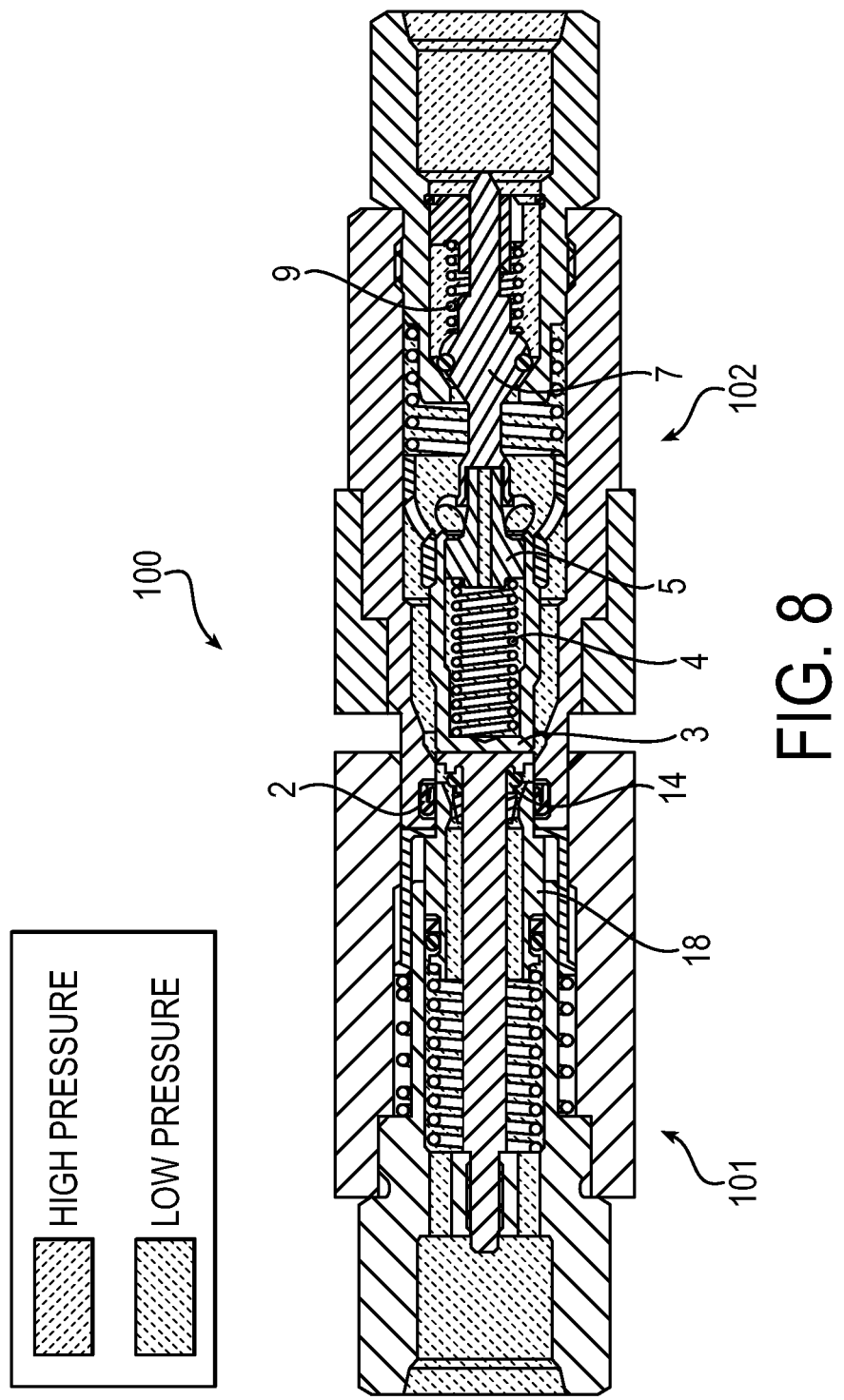
FIG. 8 is a drawing depicting a first operational step for disconnection of the coupling assembly.
Figure 9:
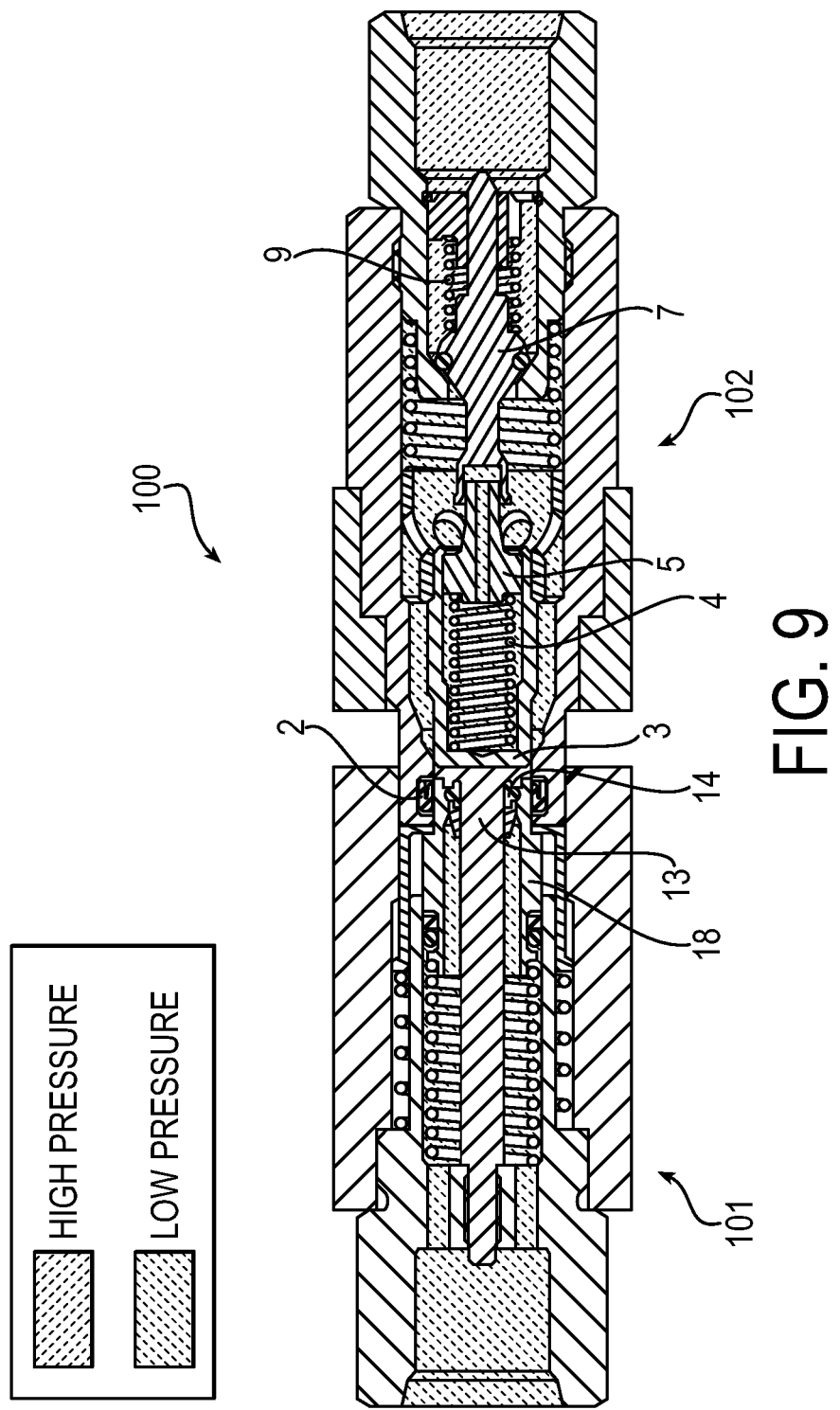
FIG. 9 is a drawing depicting a second operational step for disconnection of the coupling assembly.
Figure 10:
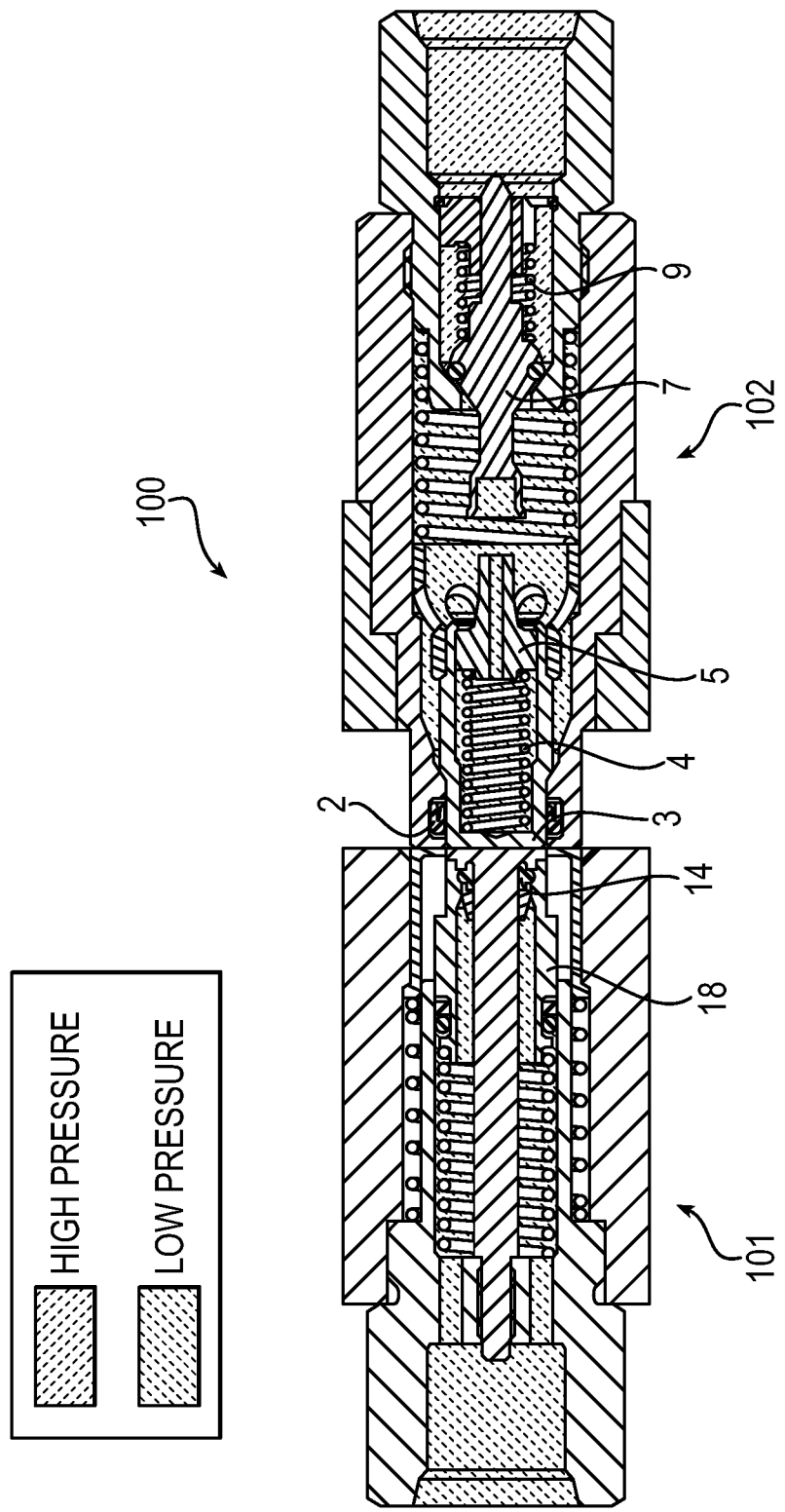
FIG. 10 is a drawing depicting a third operational step for disconnection of the coupling assembly.

FIGS. 8-10 next illustrate a progression of stages of the coupler assembly 100 to achieve disconnection of the coupler component 101 and nipple component 102. Again for clarity of illustration, reference numerals in FIGS. 8-10 are limited to the more pertinent components involved at the respective stage of operation.

FIG. 8 is a drawing depicting a first operational step for disconnection of the coupler assembly 100. In this first operational step for disconnection, the coupler component is separated from the nipple component to a degree comparable as the separation shown in FIG. 4. During disconnection, the plunger 5 begins to lose contact with the back valve 7, and thus can no longer influence the back valve 7 to retain the back valve 7 in the open position. The back valve 7 thus closes at the urging of the back valve spring 9 along with system high pressure, and thus the full fluid communication between the coupler component 101 and the nipple component 102 is disconnected. At this stage, there remains partial fluid communication, insofar as fluid communication still exists between the coupler component 101 and the front of the chamber of the nipple 102 in the area of the front valve 3. In this regard, there remains a lack of sealing engagement between the valve sleeve 18 and the coupler valve seal 14. The interface seal 2 continues to maintain sealing contact with the valve sleeve 18, but with the back valve 7 now closed, the interface seal again is isolated from the high pressure of the system similarly as in FIG. 4. With fluid communication otherwise maintained between the coupler component 101 and the nipple component 102, high pressure remains through both sides of the system at this stage of the disconnection.

FIG. 9 is a drawing depicting a second operational step for disconnection of the coupling assembly 100. In this second operational step for disconnection, the coupler component is separated from the nipple component to a degree comparable as the separation shown in FIG. 3. At this stage of disconnection, the plunger 5 is completely removed from engagement from the back valve 7, and the valve sleeve 18 has now returned to sealing engagement with the coupler valve seal 14. The coupler component 101 and the nipple component 102 are thus no longer in fluid communication. As such, the interface seal 2 is isolated from the fluid flow and any related pressure source of either component of the coupling assembly. In addition, any residual high pressure state on the coupler component side is maintained within the coupler component 101 by re-engagement of the coupler valve seal 14 to seal against the valve sleeve 18

FIG. 10 is a drawing depicting a third operational step for disconnection of the coupling assembly 100, which completes the disconnection. In this third operational step for disconnection, the coupler component is separated from the nipple component to the point of first initial contact comparably as shown in FIG. 2. During the transition from the state of FIG. 9 to the state of FIG. 10, the interface seal 2 transitions from sealing contact with the valve sleeve 18 to sealing contact with the front valve 3, and thus as referenced the state of FIG. 10 is comparable to the stage of initial contact depicted in FIG. 2. This transition is made in isolation of the two fluid systems to which each coupling component is connected.

With such sequence of connection and disconnection operational steps, aside from when full fluid flow is desired, the back valve 7 isolates the fluid flow from the front of the chamber in the area in which the components of the front valve 3 reside, and particularly isolates the interface seal 2 from high system pressure. With such isolation, the separation forces that must be overcome during connection are substantially reduced to render the connection more easily achieved as compared to conventional configurations. In addition, such isolation further protects the components of the coupling assembly, and the interface seal in particular, from damage from exposure to high pressure. As a result, the coupling assembly of the present invention is more durable as compared to conventional configurations.

An aspect of the invention, therefore, is an enhanced coupling assembly that isolates front valve components including the interface seal during the connection and/or disconnection operations. In exemplary embodiments, the coupling assembly includes a nipple component and a coupler component that are connectable to each other to form a fluid flow pathway through the coupling assembly. The nipple component comprises a nipple body that defines a chamber that receives a first valve and a second valve that are moveable within the chamber, and the first valve and the second valve are spring biased against each other. During a connection operation to connect the nipple component and the coupler component and/or during a disconnection operation to disconnect the nipple component and the coupler component, a balance of forces including the spring bias maintains the second valve in a closed position, thereby isolating the fluid flow from an area of the chamber in which components of the first valve reside. The coupling assembly may include one or more of the following features, either individually or in combination.

In an exemplary embodiment of the coupling assembly, the nipple body defines a recess that receives an interface seal, and when the second valve is in the closed position, the interface seal is isolated from the fluid flow.

In an exemplary embodiment of the coupling assembly, when the nipple component and the coupler component are in a disconnected state in which the nipple component and the coupler component are not in fluid communication, the interface seal seals against the first valve; the coupler component includes a coupler valve, and when the nipple component and the coupler component are in a connected state or partially connected state in which the nipple component and the coupler component are in fluid communication, the interface seal seals against the coupler valve.

In an exemplary embodiment of the coupling assembly, the coupler valve includes a valve sleeve, and when the nipple component and the coupler component are in a connected state or partially connected state in which the nipple component and the coupler component are in fluid communication, the interface seal seals against the valve sleeve.

In an exemplary embodiment of the coupling assembly, the valve sleeve is moveable between a first valve sleeve position corresponding to the disconnected state, and a second valve sleeve position corresponding to the connected or partially connected state; and the coupler component includes a coupler valve seal that seals against the valve sleeve when the valve sleeve is in the first valve sleeve position to prevent fluid communication between the nipple component and the coupler component, and the coupler valve seal does not seal against the valve sleeve when the valve sleeve is in the second valve sleeve position to permit fluid communication between the nipple component and the coupler component.

In an exemplary embodiment of the coupling assembly, the coupler component includes a sleeve spring that biases the valve sleeve toward the first valve sleeve position.

In an exemplary embodiment of the coupling assembly, the first valve of the nipple component includes a plunger that is spring loaded by a plunger spring, and the first valve is moveable between a first position and a second position during the connection and/or disconnection operations; the plunger spring provides a spring force during the connection and/or disconnection operations in a direction toward moving the second valve of the nipple component to an open position when the first valve is in the second position; the second valve includes a second valve spring providing a spring force that biases the second valve toward the closed position and against the spring force of the first valve; and during the connection and/or disconnection operations, a balance of forces including the spring forces of the plunger spring and the second valve spring maintains the second valve in the closed position.

In an exemplary embodiment of the coupling assembly, when the nipple component and the coupler component are in a fully connected state, pressure at the second valve is reduceable to alter the balance of forces including the spring forces to move the second valve from the closed position to an open position, thereby permitting fluid flow through the coupling assembly.

In an exemplary embodiment of the coupling assembly, the coupling assembly further includes a first valve guide that guides movement of the first valve between the first position and the second position.

In an exemplary embodiment of the coupling assembly, the nipple component further includes a second valve guide that guides movement of the second valve between the closed position and the open position.

In an exemplary embodiment of the coupling assembly, the nipple component further includes a valve spring that biases the first valve toward the first position.

In an exemplary embodiment of the coupling assembly, the coupler component includes a coupler valve that interacts against the first valve of the nipple component during the connection operation to move the first valve from the first position to the second position.

In an exemplary embodiment of the coupling assembly, the coupler component includes a face sleeve moveable between a first face sleeve position and a second face sleeve position, and during the connection operation the nipple body interacts against the face sleeve to move the face sleeve from the first face sleeve position to the second face sleeve position.

In an exemplary embodiment of the coupling assembly, the coupler component includes a valve body that is received with a housing, the valve body including a nose that extends into the housing, and the face sleeve moves between the first sleeve position and the second sleeve position within a gap formed between the nose of the valve body and an inner surface of the housing.

In an exemplary embodiment of the coupling assembly, the coupler component includes a face sleeve spring located within the gap, and the face sleeve spring biases the face sleeve toward the first face sleeve position.

Another aspect of the invention is a method of operating a coupling assembly including a connection operation for connecting the coupling assembly, the connection operation comprising the steps of: providing a coupling assembly including a nipple component and a coupler component that are connectable to each other to form a fluid flow pathway through the coupling assembly; wherein the nipple component comprises a nipple body that defines a chamber that receives a first valve and a second valve that are moveable within the chamber, and the first valve and the second valve are spring biased against each other; connecting the coupler component to the nipple component, wherein during a connection operation to connect the nipple component and the coupler component, a balance of forces including the spring bias maintains the second valve in a closed position, thereby isolating the fluid flow from an area of the chamber in which components of the first valve reside during the connection operation; and when the nipple component and the coupler component are in a fully connected state, reducing pressure at the second valve to alter the balance of forces including the spring bias to move the second valve from the closed position to an open position, thereby permitting fluid flow through the coupling assembly. The method of operating a coupling assembly may include one or more of the following features, either individually or in combination.

In an exemplary embodiment of the method of operating a coupling assembly, the nipple body defines a recess that receives an interface seal, and when the second valve is in the closed position, the interface seal is isolated from the fluid flow.

In an exemplary embodiment of the method of operating a coupling assembly, when the nipple component and the coupler component are in a disconnected state in which the nipple component and the coupler component are not in fluid communication, the interface seal seals against the first valve; the coupler component includes a coupler valve, and the method further comprising: during the connection operation, transitioning the interface seal from sealing against the first valve to sealing against the coupler valve.

In an exemplary embodiment of the method of operating a coupling assembly, the coupler valve includes a valve sleeve that is moveable between a first valve sleeve position and a second valve sleeve position, and when the nipple component and the coupler component are in a connected state or partially connected state in which the nipple component and the coupler component are in fluid communication, the interface seal seals against the valve sleeve; the coupler component includes a coupler valve seal that seals against the valve sleeve when the valve sleeve in the first valve sleeve position to prevent fluid communication between the nipple component and the coupler component; the method further comprising: during the connection operation, the first valve of the nipple component interacts against the valve sleeve to move the valve sleeve from the first valve sleeve position to the second valve sleeve position, and the coupler valve seal does not seal against the valve sleeve when the valve sleeve in the second valve sleeve position to permit fluid communication between the nipple component and the coupler component.

In an exemplary embodiment of the method of operating a coupling assembly, the first valve of the nipple component includes a plunger that is spring loaded by a plunger spring, and the first valve is moveable between a first position and a second position; the second valve includes a second valve spring providing a spring force that biases the second valve toward the closed position and against the spring force of the first valve; and the method further comprising: during the connection operation, the plunger spring provides a spring force in a direction toward moving the second valve of the nipple component to an open position when the first valve is in the second position, and a balance of forces including the spring forces of the plunger spring and the second valve spring maintains the second valve in the closed position.

In an exemplary embodiment of the method of operating a coupling assembly, when the pressure at the second valve is reduced, the balance of forces including the spring forces is altered to move the second valve from the closed position to the open position, thereby permitting fluid flow through the coupling assembly.

In an exemplary embodiment of the method of operating a coupling assembly, the method further includes performing a disconnection operation to disconnect the coupler component and the nipple component, wherein during the disconnection operation, the balance of forces including the spring bias maintains the second valve in the closed position, thereby isolating the fluid flow from the area of the chamber in which components of the first valve reside.

In an exemplary embodiment of the method of operating a coupling assembly, the nipple body defines a recess that receives an interface seal, and during the disconnection operation when the second valve is in the closed position, the interface seal is isolated from the fluid flow.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling assembly comprising:
   a nipple component and a coupler component that are connectable to each other to form a fluid flow pathway through the coupling assembly;
   wherein:
   the nipple component comprises a nipple body that defines a chamber that receives a first valve and a second valve that are moveable within the chamber, and the first valve and the second valve are spring biased against each other; and
   during a connection operation to connect the nipple component and the coupler component and/or during a disconnection operation to disconnect the nipple component and the coupler component, a balance of forces including the spring bias maintains the second valve in a closed position, thereby isolating the fluid flow from an area of the chamber in which components of the first valve reside; and
   when the nipple component and the coupler component are in a fully connected state, pressure at the second valve is reduceable to alter the balance of forces including the spring bias to maintain the second valve in an open position, thereby permitting fluid flow through the coupling assembly.

2. The coupling assembly of claim 1, wherein the nipple body defines a recess that receives an interface seal, and when the second valve is in the closed position, the interface seal is isolated from the fluid flow.

3. The coupling assembly of claim 2, wherein:
   when the nipple component and the coupler component are in a disconnected state in which the nipple component and the coupler component are not in fluid communication, the interface seal seals against the first valve;
   the coupler component includes a coupler valve, and
   when the nipple component and the coupler component are in a connected state or partially connected state in which the nipple component and the coupler component are in fluid communication, the interface seal seals against the coupler valve.

4. The coupling assembly of claim 3, wherein the coupler valve includes a valve sleeve, and when the nipple component and the coupler component are in a connected state or partially connected state in which the nipple component and the coupler component are in fluid communication, the interface seal seals against the valve sleeve.

5. The coupling assembly of claim 4, wherein:
   the valve sleeve is moveable between a first valve sleeve position corresponding to the disconnected state, and a second valve sleeve position corresponding to the connected or partially connected state; and the coupler component includes a coupler valve seal that seals against the valve sleeve when the valve sleeve is in the first valve sleeve position to prevent fluid communication between the nipple component and the coupler component, and the coupler valve seal does not seal against the valve sleeve when the valve sleeve is in the second valve sleeve position to permit fluid communication between the nipple component and the coupler component.

6. The coupling assembly of claim 5, wherein the coupler component includes a sleeve spring that biases the valve sleeve toward the first valve sleeve position.

7. The coupler assembly of claim 1, wherein:

the first valve of the nipple component includes a plunger that is spring loaded by a plunger spring, and the first valve is moveable between a first position and a second position during the connection and/or disconnection operations;

the plunger spring provides a spring force during the connection and/or disconnection operations in a direction toward moving the second valve of the nipple component to an open position when the first valve is in the second position;

the first valve further includes a first valve spring that biases the first valve toward the first position;

the second valve includes a second valve spring providing a spring force that biases the second valve toward the closed position and against the spring force of the plunger spring, wherein a spring force of the plunger spring is greater than a spring force of the second valve spring; and during the connection and/or disconnection operations, a balance of forces including the spring forces of the plunger spring and the second valve spring maintains the second valve in the closed position.

8. The coupling assembly of claim 7, wherein when the nipple component and the coupler component are in a fully connected state, pressure at the second valve is reduceable to alter the balance of forces including the spring forces to move the second valve from the closed position to an open position, thereby permitting fluid flow through the coupling assembly.

9. The coupling assembly of claim 7, further comprising a valve guide that guides movement of the first valve between the first position and the second position.

10. The coupling assembly of claim 7, wherein the nipple component further includes a valve guide that guides movement of the second valve between the closed position and the open position.

11. The coupling assembly of claim 7, wherein the coupler component includes a coupler valve that interacts against the first valve of the nipple component during the connection operation to move the first valve from the first position to the second position.

12. The coupling assembly of claim 1, wherein the coupler component includes a face sleeve moveable between a first face sleeve position and a second face sleeve position, and during the connection operation the nipple body interacts against the face sleeve to move the face sleeve from the first face sleeve position to the second face sleeve position.

13. A method of operating a coupling assembly including a connection operation for connecting the coupling assembly, the connection operation comprising the steps of:

providing a coupling assembly including a nipple component and a coupler component that are connectable to each other to form a fluid flow pathway through the coupling assembly;

wherein the nipple component comprises a nipple body that defines a chamber that receives a first valve and a second valve that are moveable within the chamber, and the first valve and the second valve are spring biased against each other;

connecting the coupler component to the nipple component, wherein during a connection operation to connect the nipple component and the coupler component, a balance of forces including the spring bias maintains the second valve in a closed position, thereby isolating the fluid flow from an area of the chamber in which components of the first valve reside during the connection operation; and when the nipple component and the coupler component are in a fully connected state, reducing pressure at the second valve to alter the balance of forces including the spring bias to move the second valve from the closed position to an open position, thereby permitting fluid flow through the coupling assembly.

14. The method of operating a coupling assembly of claim 13, wherein the nipple body defines a recess that receives an interface seal, and when the second valve is in the closed position, the interface seal is isolated from the fluid flow.

15. The method of operating a coupling assembly of claim 13, wherein:

when the nipple component and the coupler component are in a disconnected state in which the nipple component and the coupler component are not in fluid communication, the interface seal seals against the first valve;

the coupler component includes a coupler valve, and the method further comprising: during the connection operation, transitioning the interface seal from sealing against the first valve to sealing against the coupler valve.

16. The method of operating a coupling assembly of claim 15, wherein:

the coupler valve includes a valve sleeve that is moveable between a first valve sleeve position and a second valve sleeve position, and when the nipple component and the coupler component are in a connected state or partially connected state in which the nipple component and the coupler component are in fluid communication, the interface seal seals against the valve sleeve;

the coupler component includes a coupler valve seal that seals against the valve sleeve when the valve sleeve in the first valve sleeve position to prevent fluid communication between the nipple component and the coupler component;

the method further comprising: during the connection operation, the first valve of the nipple component interacts against the valve sleeve to move the valve sleeve from the first valve sleeve position to the second valve sleeve position, and the coupler valve seal does not seal against the valve sleeve when the valve sleeve in the second valve sleeve position to permit fluid communication between the nipple component and the coupler component.

17. The method of operating a coupling assembly of claim 13, wherein:

the first valve of the nipple component includes a plunger that is spring loaded by a plunger spring, and the first valve is moveable between a first position and a second position;

the first valve further includes a first valve spring that biases the first valve toward the first position;

the second valve includes a second valve spring providing a spring force that biases the second valve toward the closed position and against the spring force of the plunger spring; and the method further comprising:

during the connection operation, the plunger spring provides a spring force in a direction toward moving the second valve of the nipple component to an open position when the first valve is in the second position, and a balance of forces including the spring forces of the plunger spring and the second valve spring maintains the second valve in the closed position.

18. The method of operating a coupling assembly of claim 17, wherein when the pressure at the second valve is reduced, the balance of forces including the spring forces is altered to move the second valve from the closed position to the open position, thereby permitting fluid flow through the coupling assembly.

19. The method of operating a coupling assembly of claim 13, further comprising performing a disconnection operation to disconnect the coupler component and the nipple component, wherein during the disconnection operation, the balance of forces including the spring bias maintains the second valve in the closed position, thereby isolating the fluid flow from the area of the chamber in which components of the first valve reside.

20. The method of operating a coupling assembly of claim 19, wherein the nipple body defines a recess that receives an interface seal, and during the disconnection operation when the second valve is in the closed position, the interface seal is isolated from the fluid flow.

* * * * *